United States Patent [19]
Lee et al.

[11] Patent Number: 6,126,981
[45] Date of Patent: Oct. 3, 2000

[54] READY-TO-DRINK, ASPARTAME-SWEETENED BEVERAGES

[75] Inventors: Thomas D. Lee, Scarsdale; Robert W. Wood, Brewster, both of N.Y.

[73] Assignee: Kraft Foods, Inc., Northfield, Ill.

[21] Appl. No.: 08/268,708

[22] Filed: Jun. 30, 1994

[51] Int. Cl.[7] ............................. A23L 2/38; A23L 2/56; A23L 2/60; A23L 2/68
[52] U.S. Cl. ..................... 426/548; 426/590; 426/599
[58] Field of Search ...................... 426/548, 590, 426/599

[56] References Cited

U.S. PATENT DOCUMENTS

| | | | |
|---|---|---|---|
| 4,547,384 | 10/1985 | Kryger | 426/548 |
| 4,770,889 | 9/1988 | Sakai et al. | 426/548 |
| 4,849,238 | 7/1989 | Wakabayashi et al. | 426/548 X |
| 4,876,106 | 10/1989 | Sabatura et al. | 426/583 |
| 5,348,756 | 9/1994 | Lee et al. | 426/576 |

OTHER PUBLICATIONS

Mazur et al., "A New Sugar Substitute", The American Soft Drink Journal, Mar. 1971, pp. 94–95.

*Primary Examiner*—Helen Pratt
*Attorney, Agent, or Firm*—Thomas R. Savoie; Thomas A. Marcoux

[57] ABSTRACT

Ready-to-drink, aspartame-sweetened beverages having longer shelf-life are prepared by raising the pH of the beverage to above 3.2 while maintaining a sour taste which is equivalent to a beverage having a pH of 2.9. The beverage of this invention are formulated with a citric acid to citrate buffer salt ratio (by weight) of 2.5–4.3:1.

17 Claims, No Drawings

READY-TO-DRINK, ASPARTAME-SWEETENED BEVERAGES

BACKGROUND OF THE INVENTION

Ready-to-drink, sugar-free beverages are much sought after by a large segment of consumers who are desirous of limiting their caloric intake. Aspartame is a high-intensity sweetener that has been widely accepted as a sugar substitute. Aspartame has been used for producing sugar-free, carbonated, ready-to-drink soft drinks for a number of years. It is well-known, however, that aspartame loses its sweetness over time in an acidic, aqueous environment. Carbonated soft drink manufacturers who enjoy a relatively quick distribution and use cycle time, usually involving direct store delivery of product from local bottling facilities, have therefore been able to use aspartame as the major or sole sweetener in their beverages. For beverage products where the distribution and use cycle may extend to a period of several months, the use of aspartame as the major or sole source of sweetness in acidic, ready-to-drink beverages has been a problem.

The loss of sweetness of aspartame in aqueous systems is known to be a function of time and pH, with loss of sweetness increasing with increased time and also increasing as pH moves away from 4.3, the optimum pH for aspartame stability. A manufacturer of aspartame has reported that the half-life of aspartame in an aqueous solution at pH 4 was 260 days; whereas, the half-life at pH 3 was only 116 days. Most non-dairy beverages, especially fruit-flavored beverages, have a pH of about 3.0 or below in order to impart a pleasant sour/tart taste to the beverage. Prior attempts to raise the pH of this beverage has resulted in a less desirable taste.

It is the object of this invention to formulate sugar-free, fruit-flavored aspartame-sweetened beverages where the pH is at least 3.2 and where the sour taste of the beverage is at least as preferred to similarly flavored beverages having a pH of 2.9. This invention will be useful in the formulation of new, sugar-free, fruit-flavored, ready-to-drink, aspartame-sweetened beverage products as well as in reformulating any such existing products.

DESCRIPTION OF THE INVENTION

We have discovered that by using a combination of citric acid and citrate buffer salts at a weight ratio of citric acid to citrate salt of 2.5–4.3:1, preferably 2.7–3.5:1 and most preferably 2.9–3.2:1, a fruit-flavored, sugar-free, aspartame-containing beverage may be formulated which has a pH of from 3.2 to 3.6, but which has a sourness which is equivalent to a like-flavored beverage having a pH of about 2.9. This invention is most suitable for use in ready-to-drink beverages where aspartame provides all or at least a portion of the sweetness of the beverage. Aspartame may be used in conjunction with other intensive sweeteners, such as alitame, acesulfame-K, saccharin and sucralose. Typically, aspartame will provide the majority of the sweetness of the beverage.

A pH difference of less than about 0.2 will typically produce a noticeable taste difference to consumers. In the case of fruit-flavored beverages which are typically formulated to a pH of about 2.9 and which contain citric acid as the acidulent, the mere reduction in the level of citric acid in order to raise the pH to 3.2 will result in an undesirable loss in sourness.

It is the sour taste to which this invention is directed. As will be-appreciated by those skilled in the art, a fruit-flavor system which is optimized for a beverage having a pH of 2.9 will likely not be the optimum flavor system when it is desired to raise formulate a beverage having a pH above 3.2. It has been found that adjustments to the flavor system, which may consist of natural and/or synthetic flavor agents, will usually be necessary when an existing 2.9 pH beverage is raised to a pH above 3.2 by means of this invention. These adjustments may include an increased level of flavor and/or a substitution of one or more synthetic flavor component for a similar, synthetic flavor component. In order to optimize the flavor of the beverage, it may be desirable to increase the flavor level by as much as about 20% by weight; however, typically any such increase would be from about 4 to 20%, more typically from about 5% to about 10%.

In the instance when it is desired to raise the pH of an existing citric acid-containing, aspartame-sweetened, fruit-flavored, bottled beverage from below 3.0 to above 3.2 without lowering the sour taste of the beverage the citric acid level may either be increased or decreased by 4 to 30% by weight. In the case where the existing beverage also contains citrate buffer salts, the level of these salts is raised by 150 to 300% by weight.

The citrate buffer salts which are utilized in this invention will typically be selected from the group consisting of trisodium citrate, tripotassium citrate, and combinations thereof. Tripotassium citrate is the preferred citrate buffer salt. These citrate buffer salts will typically be the only buffer agents contained in the beverage and citric acid will typically be the only significant acidulent contained in the beverage.

The beverage formulations of this invention may be produced by standard procedures such as cold-filled, in which event a preservative will be included in the formulation, or hot-fill. The beverage formulations may contain any of the common functional ingredients employed to produce commercially-acceptable, fruit-flavored beverages. Preservatives, such as potassium sorbate and/or sodium benzoate, color agents, clouding agents and viscosity building agents, such as gums (e.g., sodium methylcellulose) are typically included in the beverage formulations of this invention.

This invention is further described but not limited by the following Examples.

EXAMPLE 1

A lemonade-flavored beverage having a pH of 2.92 was reformulated by adjusting levels of ingredients to obtain a pH in excess of 3.2. All formulations in the Example utilized the same ingredients.

| Ingredient | Control (parts by wt.) | Variant A (parts by wt.) | Variant B (parts by wt.) |
|---|---|---|---|
| Water | 990.037 | 989.626 | 989.612 |
| Preservative | 0.30 | 0.30 | 0.30 |
| Citric Acid (CA) | 5.94 | 5.435 | 5.435 |
| Aspartame | 0.436 | 0.436 | 0.436 |
| Tripotassium Citrate (KC) | 1 | 1.85 | 1.85 |
| Cloud and Color Agents | 0.851 | 0.851 | 0.851 |
| Gum Thickener | 0.1 | 0.1 | 0.1 |
| Lemon Flavors | 1.336 | 1.402 | 1.416 |
| pH | 2.92 | 3.27 | 3.23 |
| CA:KC ratio | 5.94 | 2.94 | 2.94 |

Variants A and B were judged by a panel of expert beverage tasters to have a "good" taste and a sourness equivalent to the control.

EXAMPLE 2

A fruit punch-flavored beverage having a pH of 2.93 was reformulated by adjusting levels of ingredients to obtain a pH in excess of 3.2. All formulations in this Example utilized the same ingredients.

| Ingredient | Control (parts by wt.) | Variant A (parts by wt.) |
|---|---|---|
| Water | 994.983 | 994.516 |
| Preservative | 0.30 | 0.30 |
| Citric Acid | 3.08 | 2.948 |
| Aspartame | 0.416 | 0.416 |
| Tripotassium Citrate | 0.425 | 1.0 |
| Cloud and Color Agents | 0.305 | 0.305 |
| Gum Thickener | 0.1 | 0.1 |
| Fruit Flavors | 0.391 | 0.415 |
| pH | 2.93 | 3.25 |
| CA:KC ratio | 7.25 | 2.95 |

Variant A was judged by a panel of expert beverage tasters to have a "good" taste and a sourness equivalent to the control.

EXAMPLE 3

A pink grapefruit-flavored beverage having a pH of 2.85 was reformulated by adjusting levels of ingredients to obtain a pH in excess of 3.2. All formulations in this Example utilized the same ingredients.

| Ingredient | Control (parts by wt.) | Variant A (parts by wt.) |
|---|---|---|
| Water | 991.278 | 990.678 |
| Preservative | 0.3 | 0.3 |
| Citric Acid | 5.168 | 4.728 |
| Aspartame | 0.463 | 0.463 |
| Tripotassium Citrate | 0.580 | 1.5 |
| Cloud and Color Agents | 0.411 | 0.411 |
| Gum Thickener | 0.1 | 0.1 |
| Fruit Flavors | 1.7 | 1.82 |
| pH | 2.85 | 3.22 |
| CA:KC ratio | 8.5 | 3.15 |

Variant A was judged by a panel of expert beverage tasters to have a "good" taste and a sourness equivalent to the control.

EXAMPLE 4

A raspberry-flavored beverage having a pH of 2.9 was reformulated by adjusting levels of ingredients to obtain a pH of at least 3.2. All formulations in this Example utilized the same ingredients.

| Ingredient | Control (parts by wt.) | Variant A (parts by wt.) | Variant B (parts by wt.) |
|---|---|---|---|
| Water | 995.316 | 995.054 | 993.504 |
| Preservative | 0.3 | 0.3 | 0.3 |
| Citric Acid | 2.4 | 2.15 | 3.0 |
| Aspartame | 0.605 | 0.605 | 0.605 |
| Tripotassium Citrate | 0.2 | 0.5 | 1.2 |
| Color Agents | 0.117 | 0.117 | 0.117 |
| Flavors | 1.062 | 1.274 | 1.274 |
| pH | 2.9 | 3.2 | 3.31 |
| CA:KC ratio | 12 | 4.3 | 2.5 |

Variants A and B were judged by a panel of expert beverage tasters to have a "good" taste and a sourness equivalent to the control.

Having thus described the invention what is claimed is:

1. A bottled, non-carbonated, sugar-free, fruit-flavored beverage comprising fruit flavor, aspartame, citric acid and citrate buffer salt, wherein the beverage has a pH of from 3.2 to 3.6, a weight ratio of the citric acid to the citrate buffer salt of 2.7–3.5:1 and a sour taste which is equivalent to fruit-flavored beverages having a pH of about 2.9, and wherein the sweetness of the beverage is provided by aspartame alone or by aspartame for a majority of the sweetness in combination with the other intensive sweeteners selected from the group consisting of alitame, acesulfame-K, saccharin, sucralose and combinations thereof.

2. The beverage according to claim 1 wherein the citrate salt is selected from the group consisting of trisodium citrate, tripotassium citrate and combinations thereof.

3. The beverage according to claim 1 wherein the ratio is 2.9–3.2:1.

4. The beverage according to claim 1 wherein the beverage contains a preservative and is cold-filled.

5. The beverage according to claim 1 wherein the beverage is preservative-free and is hot-filled.

6. The beverage according to claim 1 wherein the beverage contains a second sweetening agent selected from the group consisting of alitame, acesulfame-K, saccharin, sucralose and combinations thereof.

7. The beverage according to claim 1 wherein aspartame is the sole sweetener.

8. The beverage according to claim 1 wherein the beverage is lemonade-flavored.

9. A method for raising the pH of a non-carbonated, sugar-free, citric acid-containing and citrate buffer salt-containing fruit-flavored, bottled beverage, wherein the sweetness of the beverage is provided by aspartame alone or by aspartame for a majority of the sweetness in combination with other intensive sweeteners selected from the group consisting of alitame, acesulfame-K, saccharin, sucralose and combinations thereof from below 3.0 to above 3.2 without lowering the sour taste of the beverage comprising the steps of adjusting the level of citric acid, increasing the level of citrate buffer salt, and decreasing the weight ratio of citric acid to citrate buffer salt to 2.7–3.5:1.

10. The method according to claim 9 wherein the citrate salt is selected from the group consisting of trisodium citrate, tripotassium citrate and combinations thereof.

11. The method according to claim 9 wherein the ratio is 2.9–3.2:1.

12. The method according to claim 9 wherein the citric acid weight level is decreased by 4 to 30%.

13. The method according to claim 12 wherein the citrate salt weight level is increased from 150 to 300%.

14. The method according to claim 9 wherein the citrate acid level is increased by 4 to 30%.

15. The method according to claim 9 wherein the citrate salt weight level is increased from 150 to 300%.

16. The method according to claim 9 wherein citric acid is the only acidulent contained in the beverage and citrate salts are the only buffer salts contained in the beverage.

17. The method according to claim 9 wherein the flavor level is increased by from 4 to 20% by weight.

* * * * *